(12) United States Patent
Andersen

(10) Patent No.: US 11,933,434 B1
(45) Date of Patent: Mar. 19, 2024

(54) CLAMP AND GASKET SYSTEM

(71) Applicant: Cairn5 LLC, Elkins, AR (US)

(72) Inventor: Trent Andersen, Fayetteville, AR (US)

(73) Assignee: Cairn5 LLC, Elkins, AR (US)

( * ) Notice: Subject to any disclaimer, the term of this patent is extended or adjusted under 35 U.S.C. 154(b) by 674 days.

(21) Appl. No.: 16/927,288

(22) Filed: Jul. 13, 2020

Related U.S. Application Data

(60) Provisional application No. 62/873,356, filed on Jul. 12, 2019.

(51) Int. Cl.
*F16L 23/10* (2006.01)
*F16L 23/22* (2006.01)

(52) U.S. Cl.
CPC ............... *F16L 23/10* (2013.01); *F16L 23/22* (2013.01)

(58) Field of Classification Search
CPC .................................. F16L 23/22; F16L 23/10
See application file for complete search history.

(56) References Cited

U.S. PATENT DOCUMENTS

| | | | | |
|---|---|---|---|---|
| 3,563,571 A | * | 2/1971 | Werra | F16L 23/10 285/41 |
| 4,002,344 A | * | 1/1977 | Smith | F16J 15/061 277/609 |
| 4,331,012 A | * | 5/1982 | Swisher | G01R 11/02 70/164 |
| 2007/0252343 A1 | * | 11/2007 | Westhoff | F16L 5/10 277/609 |

* cited by examiner

*Primary Examiner* — James M Hewitt, II
(74) *Attorney, Agent, or Firm* — Polsinelli PC

(57) ABSTRACT

A clamp and gasket system secures adjoining ends of sanitary tubing together. The clamp and gasket system may include a holding member. The holding member holds the gasket to the clamp to prevent or reduce loss of or damage to the gasket. The gasket may be formed from stainless steel and seal against concave surfaces in the ends of the adjoining sanitary tubes.

24 Claims, 4 Drawing Sheets

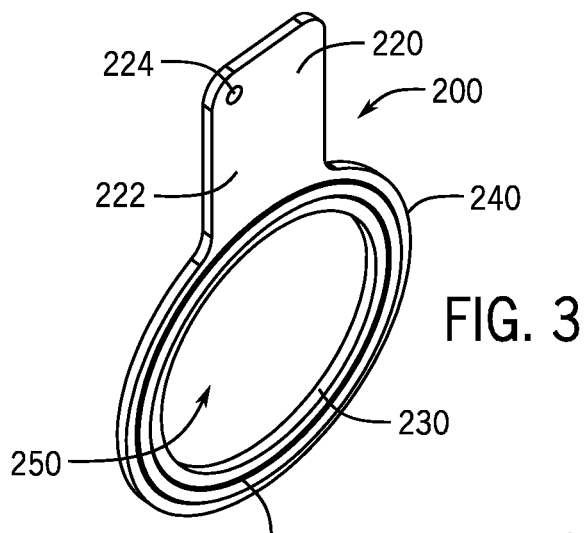
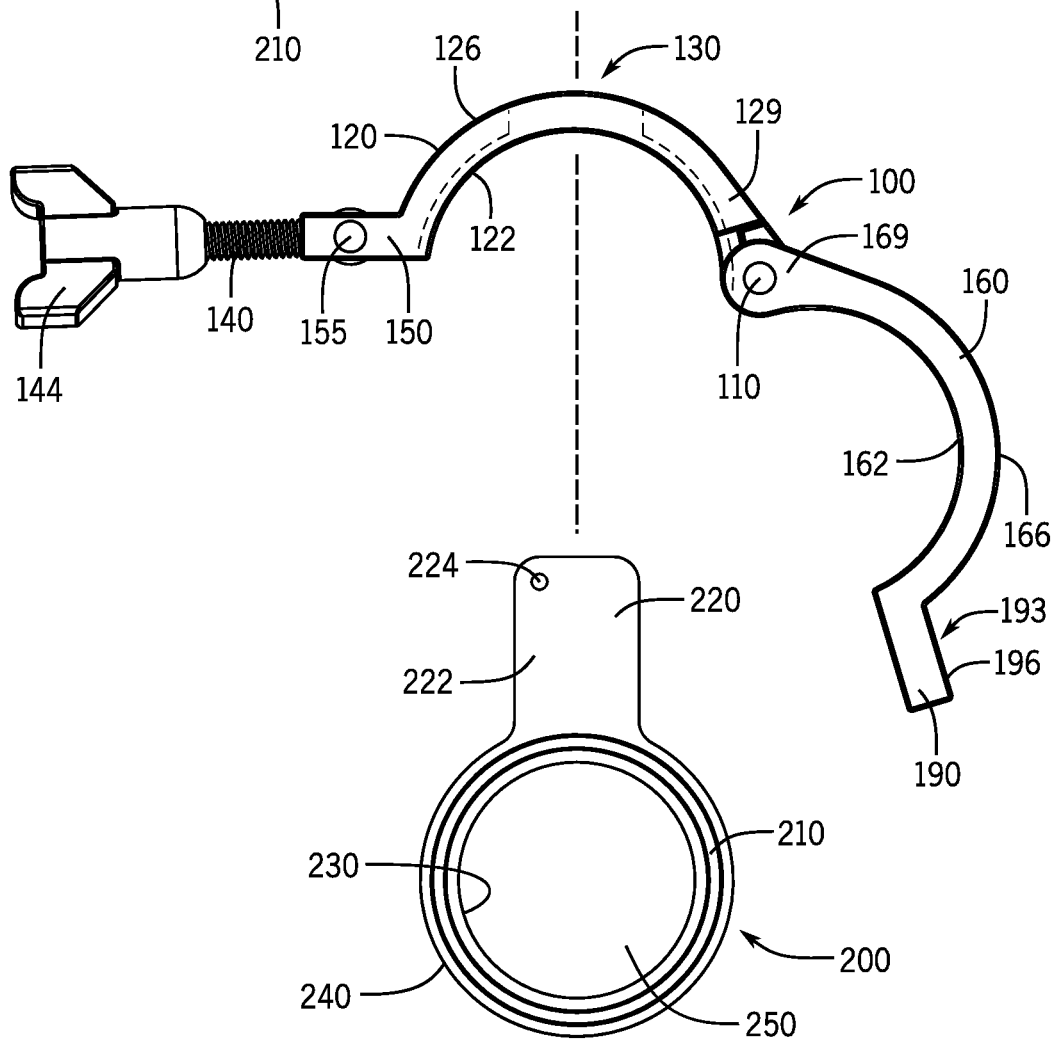
FIG. 3
FIG. 4

CLAMP AND GASKET SYSTEM

This application claims priority to U.S. Provisional Patent Application No. 62/873,356 filed Jul. 12, 2019.

Field of the Invention

The present invention relates to a clamp and gasket system.

BACKGROUND OF THE INVENTION

Gaskets and clamps are commonly used to secure adjoining ends of sanitary tubing in industrial food systems and in other applications. The gaskets are commonly made of plastic materials, such as, for example, Teflon, biton, buna, rubber, etc. These plastic gaskets have elasticity to compress and seal between the adjoining ends of the sanitary tubing when the adjoining ends are secured together with the clamp.

It is problematic in the food processing industry when the plastic gaskets become lost and accidentally mix into food materials being transferred by the sanitary tubing. The plastic gaskets may be ground up or mixed in with the food product resulting in costly recalls of the food product.

The plastic gaskets are often impregnated with metal materials such that plastic gaskets (or bits and pieces thereof) may be detectable by magnetic screening processes. Unfortunately, if the plastic gaskets are processed into too fine of particles, then the presence of the particles in the food product from the plastic gaskets may not be detected by the magnetic screening.

The plastic gaskets also commonly include a raised locator surface between a flat inner sealing surface and a flat outer sealing surface. As the adjoining ends of sanitary tubing are brought together for joining, the raised locator surface of the plastic gasket helps to align or guide flat sealing surfaces of the plastic gasket with flat sealing surfaces of the adjoining ends.

SUMMARY OF THE INVENTION

A clamp and gasket system is described. The clamp and gasket system secures adjoining ends of sanitary tubing together. The clamp and gasket system includes a clamp, a gasket, and a holding member. The system holds the gasket to the clamp to prevent or reduce loss of or damage to the gasket.

The clamp and gasket system is used to secure together a ferrule of a first sanitary tube and a ferrule of a second sanitary tube. The holding member secures the gasket to the clamp to help prevent loss or damage to the gasket when the first sanitary tube and the second sanitary tube are separated for cleaning or maintenance.

The clamp secures around outer tapered surfaces of the ferrules. The gasket seals adjoining ends of the first sanitary tube and the second sanitary tube. The gasket includes a tab portion that extends through a slot or opening in the clamp. The holding member secures to the tab portion. Once the holding member secures to the tab portion, the gasket is generally held to the clamp, and the gasket cannot normally be separated from the clamp. The holding member helps to prevent loss or damage to the gasket.

The clamp and gasket system is configured to form a unitary member with the clamp, the gasket, and the holding member affixed or connected together. The clamp and gasket system is configured to maintain all of its components in a single inter-connected system when the clamp and gasket system is removed from securing the first sanitary tube and the second sanitary tube. This helps to prevent the gasket from becoming separated from the clamp, lost and/or damaged.

In one aspect, a clamp and gasket system is described. The clamp and gasket system includes a clamp having a first arm and a second arm. The first arm and the second arm are pivotally connected together. The first arm includes a slot. The clamp and gasket system includes a gasket. The gasket includes a tab portion. The tab portion includes an opening. The tab portion is configured to pass through the slot of the first arm. A holding member is configured to engage with the opening of the tab portion. When the holding member is engaged to the opening of the tab portion, the gasket is not generally separable from the clamp.

In another aspect, a gasket is made wholly or nearly completely from stainless steel or other food-safe metal alloy. The gasket is normally incompressible and not bendable during use. Concave portions on ends of ferrules sealing against convex portions of the gasket.

In another aspect, tangents of inner and outer radii of a concave portion of a ferrule seal against a convex portion of a gasket.

In another aspect, a sealing surface between a gasket and a ferrule is formed between a convex portion of the gasket intersecting with tangents of inner and outer radii of a concave portion of the ferrule.

In another aspect, a clamp and gasket system to seal ends of sanitary tubing is described. The system includes a gasket. The gasket includes a seal surface positioned between an inner diameter and an outer diameter of the gasket. The seal surface includes a first seal surface having a first convex portion and a second seal surface having a second convex portion on opposite sides of the gasket. The system includes a clamp. The clamp includes a first arm and a second arm. The first arm and the second arm are pivotally connected together. An end of the first sanitary tube includes a first concave portion. An end of the second sanitary tube includes a second concave portion. The clamp holds the end of the first sanitary tube together with the end of the second sanitary tube in a sealing engagement with the gasket in which the first concave portion seals against the first convex portion and the second concave portion seals against the second convex portion.

In another aspect, a gasket for use in sealing adjoining ends of sanitary tubing is described. The gasket includes a seal surface positioned between an inner diameter and an outer diameter of the gasket. The seal surface includes a first seal surface having a first convex portion and a second seal surface having a second convex portion on opposite sides of the gasket. The gasket is formed from stainless steel or other food-safe metal alloy. The gasket is configured to seal against concave portions of the adjoining ends the sanitary tubing. The gasket is normally incompressible and does not bend or flex during use.

In another aspect, a method sealing adjoining ends of sanitary tubing is described. An end of a first sanitary tube is positioned proximate an end of a second sanitary tube. The end of the first sanitary tube includes a first concave portion. The end of the second sanitary tube includes a second concave portion. A gasket is positioned between the ends of the first sanitary tube and the second sanitary tube. The gasket includes a first seal surface having a first convex portion and a second seal surface having a second convex portion on opposite sides of the gasket. A clamp is tightened over the ends and the gasket. The clamp holds the end of the first sanitary tube together with the end of the second sanitary tube in a sealing engagement with the gasket with the first concave portion sealing against the first convex portion and the second concave portion sealing against the second convex portion. The tightening of the clamp forces the first concave portion against the first convex portion and the second concave portion against the second convex portion in a sealing engagement.

BRIEF DESCRIPTION OF THE DRAWINGS

FIG. 3 is a perspective view of the gasket.

FIG. 4 is a perspective view of the clamp and gasket system in the open position.

DETAILED DESCRIPTION

Figure 1:
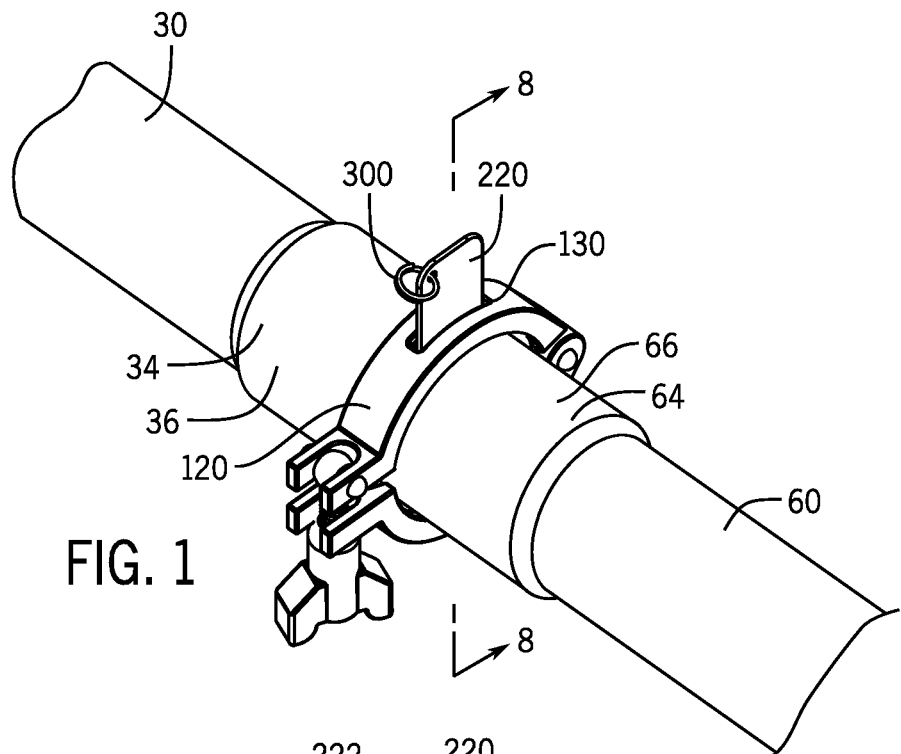
FIG. 1 is a perspective view of the clamp and gasket system holding the first sanitary tube and the second sanitary tube together.
Figure 2:
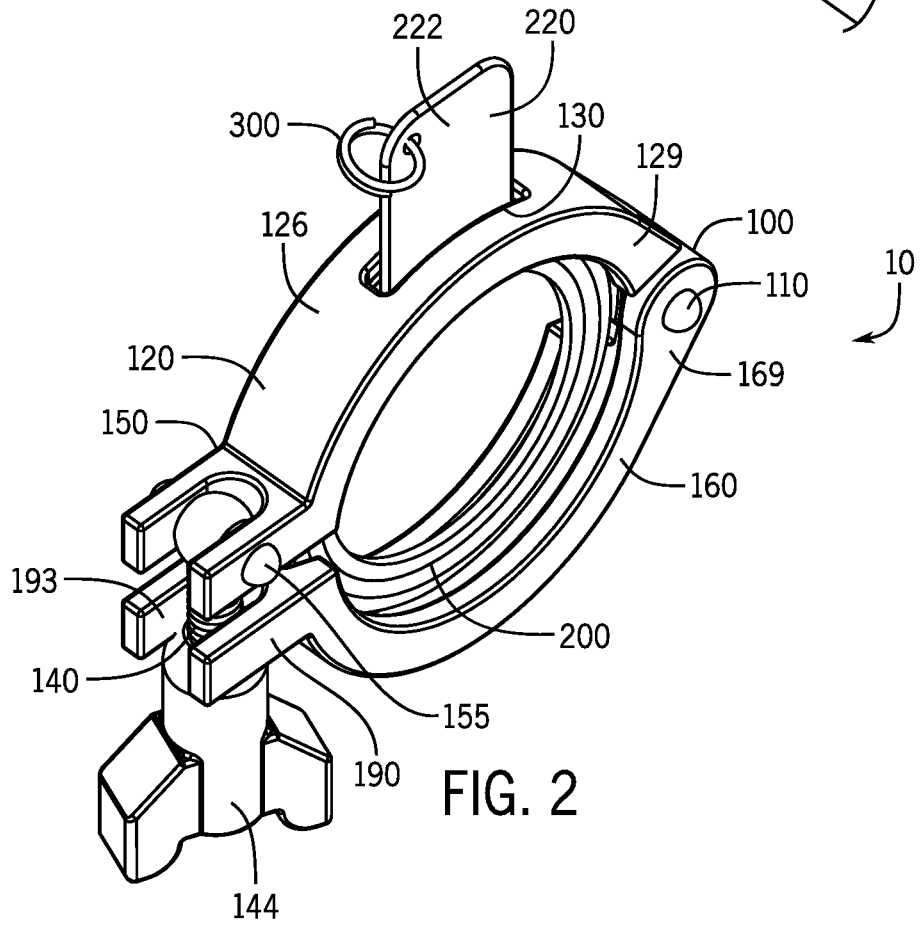
FIG. 2 is a perspective view of the clamp and gasket system.
Figure 5:
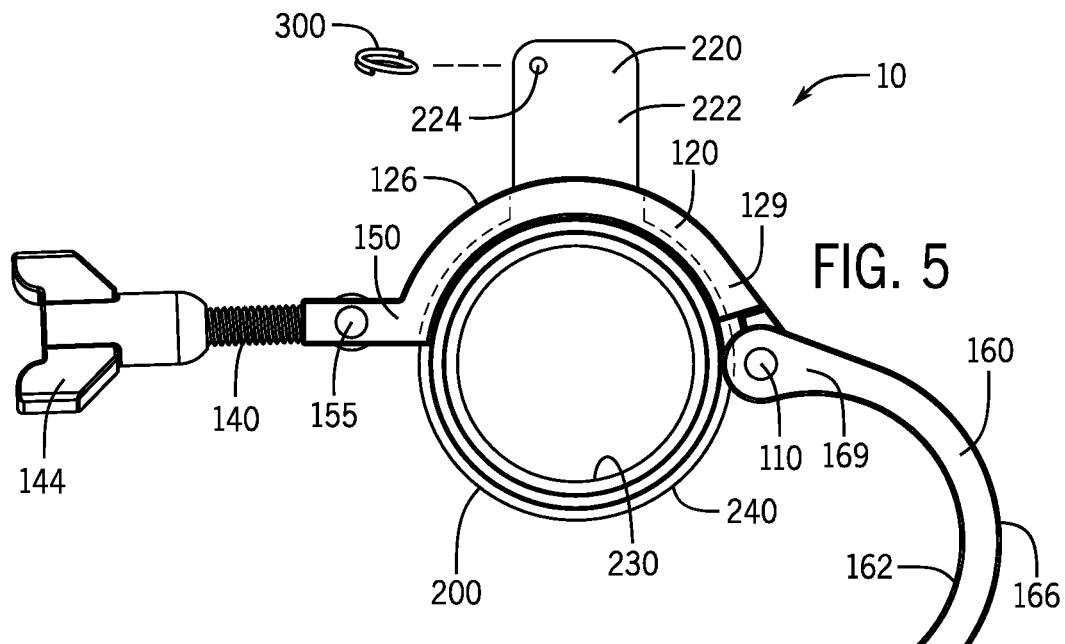
FIG. 5 is a perspective view of the clamp and gasket system in the open position with the tab of the gasket inserted through the slot of the clamp.
Figure 7:
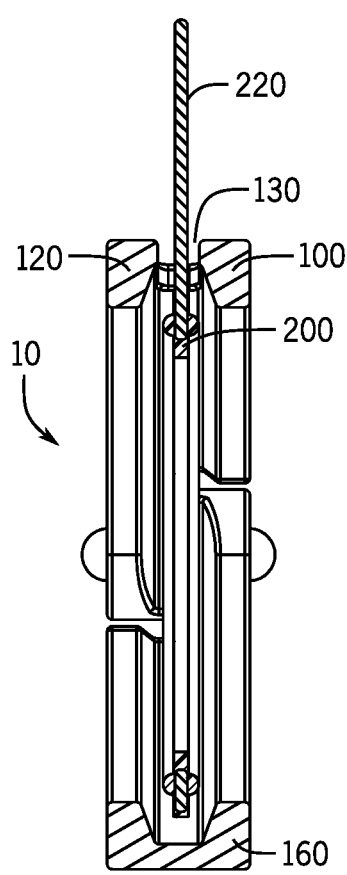
FIG. 7 is a sectional view of the clamp and gasket system in the closed position with the tab of the gasket inserted through the slot of the clamp.
Figure 6:
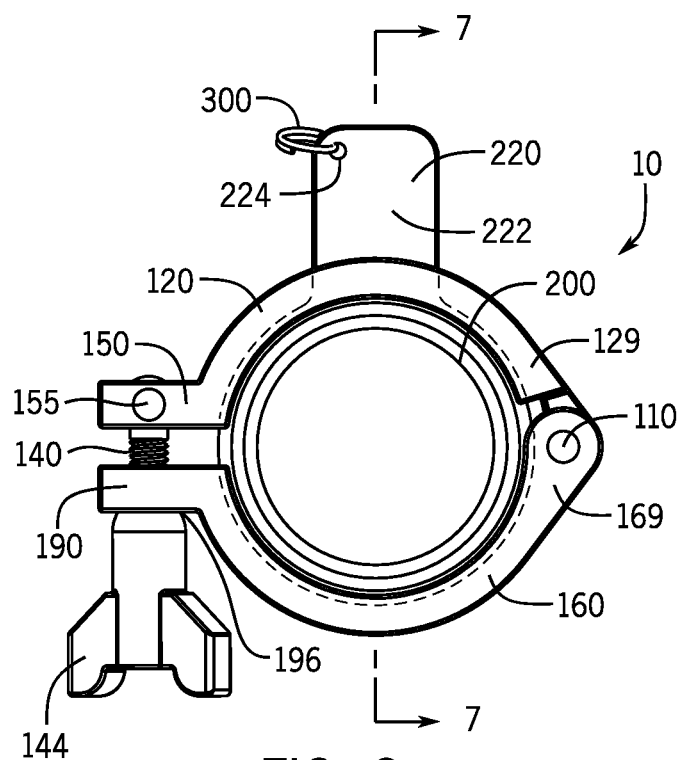
FIG. 6 is a perspective view of the clamp and gasket system in the closed position with the tab of the gasket inserted through the slot of the clamp.

For purposes of this application, any terms that describe relative position (e.g., "upper", "middle", "lower", "outer", "inner", "above", "below", "bottom", "top", etc.) refer to an embodiment of the invention as illustrated, but those terms do not limit the orientation in which the embodiments can be used.

A clamp and gasket system 10 is described with reference to FIGS. 1-9. The clamp and gasket system 10 includes a clamp 100, a gasket 200, and a holding member 300. The clamp and gasket system 10 is used to secure or hold together a first sanitary tube 30 and a second sanitary tube 60. The first sanitary tube 30 and the second sanitary tube 60 may be used in industrial applications for the transfer of fluidic compositions, slurries, liquids, etc. The clamp and gasket system 10 may be utilized in industrial food production and processing applications where sanitation is especially important.

With reference to FIG. 1, the clamp 100 secures around a ferrule 34 of the first sanitary tube 30 and a ferrule 64 of the second sanitary tube 60. The clamp 100 secures around and/or against an outer tapered surface 36 of the ferrule 34 of the first sanitary tube 30 and an outer tapered surface 66 of the ferrule 64 of the second sanitary tube 60. The clamp 100 holds adjoining ends of the first sanitary tube 30 and the second sanitary tube 60 together. The clamp 100 holds the adjoining ends of the first sanitary tube 30 and the second sanitary tube 60 together and against a seal surface 210 of the gasket 200.

A perspective view of the gasket 200 is shown in FIG. 3. The gasket 200 seals the adjoining ends of the first sanitary tube 30 and the second sanitary tube 60. The gasket 200 includes a tab portion 220 that extends through a slot 130 or opening in the first clamp arm 120. The holding member 300 secures to the tab portion 220. Once the holding member 300 secures to the tab portion 220, the gasket 200 is generally held to the clamp 100, and the gasket 200 cannot normally be separated from the clamp 100. The holding member 300 helps to prevent loss or damage to the gasket 200.

In a typical industrial setting, the first sanitary tube 30 and the second sanitary tube 60 may be periodically separated for cleaning, maintenance, etc. The use of the clamp and gasket system 10 with the holding member 300 helps prevent the separation or loss of the gasket 200 from the clamp 100. The use of the clamp and gasket system 10 with the holding member 300 also helps to prevent damage to the gasket 200.

The slot 130 or opening in the first clamp arm 120 is sized or configured to permit the tab portion 220 to pass through the slot 130 or opening. The slot 130 may include a rectangular or ovular shape. The slot 130 is generally aligned or parallel to a length of the first clamp arm 120. A length of the slot 130 is greater than both a depth and a width of the slot 130. Generally, the slot 130 or opening in the first clamp arm 120 will be slightly larger than the tab portion 220. Although the present disclosure describes that the first clamp arm 120 includes the slot 130, the second clamp arm 160 may include the slot 130 or opening. In other aspects, both the first clamp arm 120 and the second clamp arm 160 include the slot 130.

The tab portion 220 includes a tag area 222 suitable for markings, writing, or other indicia. The tag area 222 may include a description of the size of the gasket 200. The tag area 222 may include a reference or part number, such that the user may maintain inventory or records of the use of the specific gasket 200. The tag area 222 may include information regarding the manufacturer, materials used in the gasket 200, or other information. In this aspect, the tab portion 220 includes a generally rectangular shape. The tag area 222 is generally visible when the clamp and gasket system 10 is installed on the first sanitary tube 30 and the second sanitary tube 60. Thus, an operator will be able to read any writing or indicia on the tag area 222 without disconnecting the first sanitary tube 30 and the second sanitary tube 60. The tab portion 220 may include a thickness approximately the same or similar to a thickness of a remainder of the gasket 200. The tab portion 220 includes a tag opening 224 that receives the holding member 300.

The gasket 200 includes a generally circular shape with an inner diameter 230 and an outer diameter 240. The tab portion 220 extends outward from the outer diameter 240. The tab portion 220 may be integral with the outer diameter 240. The inner diameter 230 defines an opening 250 for the passage of the fluidic compositions, slurries, liquids, etc. The tab portion 220 extends outward away from the opening 250. The seal surface 210 of the gasket 200 is generally between the inner diameter 230 and the outer diameter 240. The seal surface 210 may include a raised ridge, integral o-ring, or other surface that protrudes or extends from the gasket 200.

The clamp 100 includes a first clamp arm 120 rotatably connected to a second clamp arm 160 at a pivot 110. A pivot end 129 of the first clamp arm 120 and a pivot end 169 of the second clamp arm 160 join at the pivot 110. The first clamp arm 120 and the second clamp arm 160 have a generally semicircular shape. The first clamp arm 120 and the second clamp arm 160 pivot between open and closed positions.

With reference to FIG. 4, the first clamp arm 120 includes an inner tapered surface 122 generally opposite from an outer surface 126. A threaded shaft 140 is pivotally connected to a clamp arm end 150 of the first clamp arm 120 at a pivot 155. The threaded shaft 140 threadably receives a threaded tightener 144, such as a nut, a wing nut, extended wing nut, flange nut, or the like.

The slot 130 passes from the inner tapered surface 122 to the outer surface 126 of the first clamp arm 120. The slot 130 completely passes through a width of the first clamp arm 120. When the tab portion 220 is inserted through the slot 130, the tab portion 220 extends past the outer surface 126 of the first clamp arm 120. The tab portion 220 extends generally perpendicular to lengths of the first sanitary tube 30 and the second sanitary tube 60.

The second clamp arm 160 also includes an inner tapered surface 162 generally opposite from an outer surface 166. The second clamp arm 160 includes a clamp arm end 190 with an opening 193. When the clamp 100 is closed, the threaded tightener 144 may be threadably tightened on the threaded shaft 140 until the threaded tightener 144 contacts an outer surface 196 of the opening 193.

In this aspect, the holding member 300 removably connects or engages to the tab portion 220. In this aspect, the holding member 300 includes a key ring that may be engaged and disengaged from the tag opening 224 in the tab portion 220. When the holding member 300 is engaged to the tag opening 224 of the tab portion 220, the holding member 300 or the combination of the holding member 300 and the tab portion 220 is too large to pass back through the slot 130 in the first clamp arm 120. When the holding member 300 is engaged to the tag opening 224 with the tab portion 220 passing through the slot 130, the gasket 200 cannot generally be separated from the clamp 100. In other aspects, the holding member 300 may include a bolt/nut, d-ring, carabiner, a lock, or other mechanical structures that includes a portion that passes through the tag opening 224 in the tab portion 220.

In order to use the clamp and gasket system 100, the user inserts the tab portion 220 of the gasket 200 through the slot 130 in the first clamp arm 120. In this aspect, the slot 130 is in between the pivot end 129 of the first clamp arm 120 and the clamp arm end 150 of the first clamp arm 120.

Next, the user closes the clamp 100 by pivoting the first clamp arm 120 and the second clamp arm 160 together. The user rotates the threaded shaft 140 such that threaded shaft 140 is moved to a position inside of the clamp arm end 190 of the second clamp arm 160. Now, the threaded tightener 144 is tightened against the clamp arm end 190 of the second clamp arm 160, which compresses the inner tapered surfaces 122 and 162 of the first clamp arm 120 and the second clamp arm 160 against the outer tapered surface 36 of the ferrule 34 of the first sanitary tube 30, and the outer tapered surface 66 of the ferrule 64 of the second sanitary tube 60.

The holding member 300 is inserted into the tag opening 224 of the tab portion 220 in order to affix or connect the holding member 300 to the tab portion 220. Once the holding member 300 is affixed or connected to the tag opening 224, the tab portion 220 cannot be withdrawn from the slot 130 due to the physical size of the holding member 300.

The clamp 100, gasket 200, and holding member 300 may all be formed from food safe stainless steel, such as, for example, 304 stainless steel. The clamp 100, gasket 200, and holding member 300 may be provided in a variety of different sizes commonly used in industrial plumbing connections. The gasket 200 shown in FIGS. 1-9 is for two inch sanitary tubes.

Figure 8:
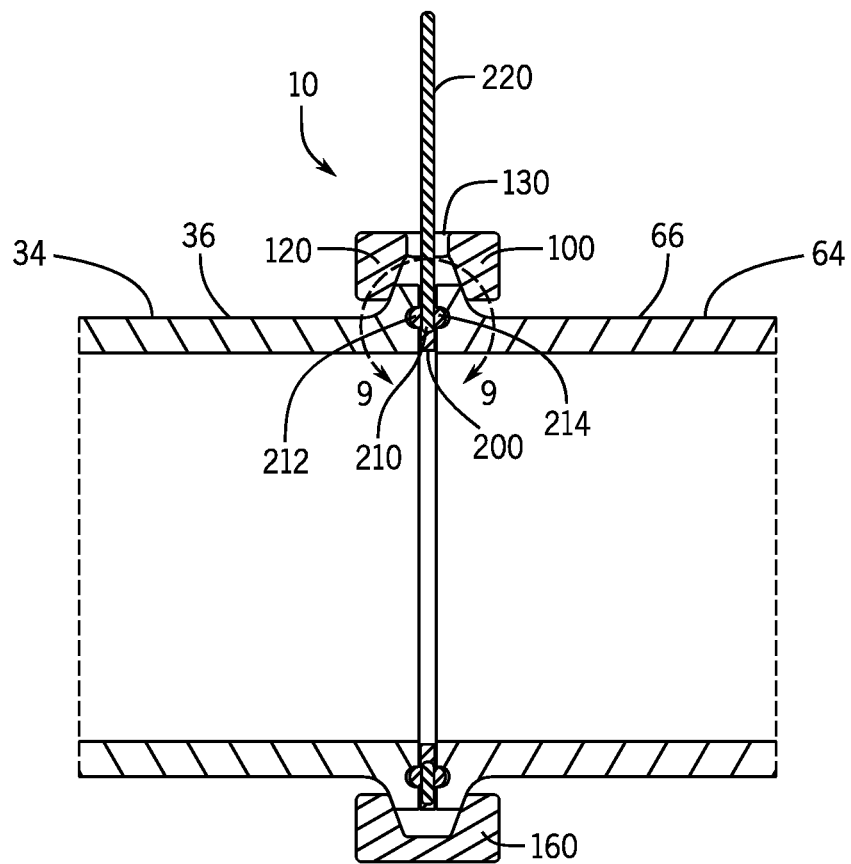
FIG. 8 shows a sectional view of the clamp secured around the ferrule of the first sanitary tube and the ferrule of the second sanitary tube.
Figure 9:
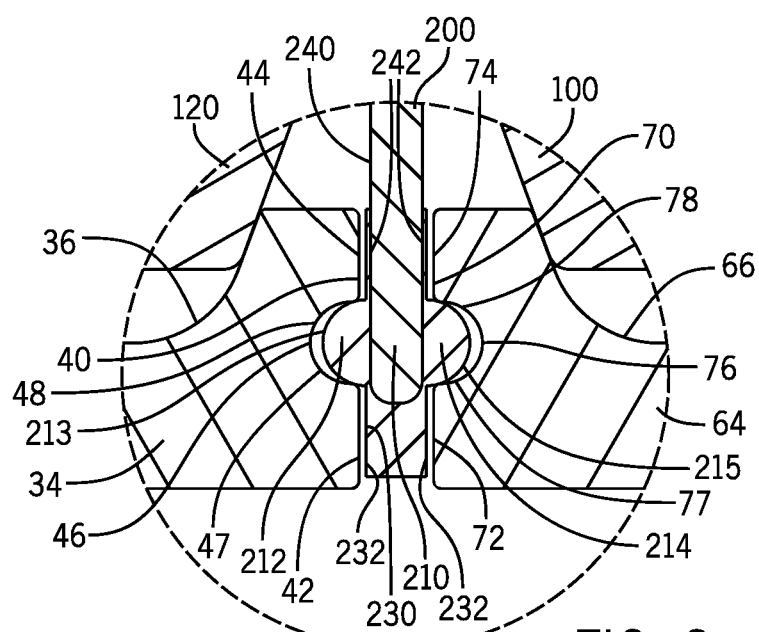
FIG. 9 shows a close-up sectional view of the clamp secured around the ferrule of the first sanitary tube and the ferrule of the second sanitary tube.

FIGS. 8 and 9 show sectional views of the clamp 100 secured around the ferrule 34 of the first sanitary tube 30 and the ferrule 64 of the second sanitary tube 60. The clamp 100 secures around and/or against the outer tapered surface 36 of the ferrule 34 of the first sanitary tube 30 and the outer tapered surface 66 of the ferrule 64 of the second sanitary tube 60. The clamp 100 holds adjoining ends of the first sanitary tube 30 and the second sanitary tube 60 together. The tightening of the clamp 100 urges or drives the adjoining ends of the first sanitary tube 30 and the second sanitary tube 60 together for a sealing engagement. The clamp 100 holds the adjoining ends of the first sanitary tube 30 and the second sanitary tube 60 together to seal against the seal surface 210 of the gasket 200. The seal surface 210 of the gasket 200 is generally between the inner diameter 230 and the outer diameter 240 of the gasket 200. The seal surface 210 includes a first seal surface 212 and a second seal surface 214 on opposite sides of the gasket 200.

The ferrule 34 includes an end surface 40 with a generally flat inner surface 42 and a generally flat outer surface 44. A concave portion 46 is between the generally flat inner surface 42 and the generally flat outer surface 44. The end surface 40 is generally perpendicular to a length of the ferrule 34. Similarly, the ferrule 64 includes an end surface 70 with a generally flat inner surface 72 and a generally flat outer surface 74. A concave portion 76 is between the generally flat inner surface 72 and the generally flat outer surface 74. The end surface 70 is also generally perpendicular to a length of the ferrule 64.

In the aspect shown, the concave portion 46 of the end surface 40 seals against the first seal surface 212, while the concave portion 76 of the end surface 70 seals against the second seal surface 214.

With respect to FIG. 8, the concave portion 46 include includes an inner radius 47 and an outer radius 48. Tangents of the inner radius 47 and the outer radius 48 seal against a convex portion 213 of the first seal surface 212. Notably, when sealed, the generally flat inner surface 42 and the generally flat outer surface 44 do not contact or touch a flat surface 232 of the inner diameter 230 and/or a flat surface 242 of the outer diameter 240 of the gasket 200. When fully sealed, a space of void is formed between the generally flat inner surface 42 and the flat surface 232 of the inner diameter 230, and a similar space or void is formed between the generally flat outer surface 44 and the flat surface 242.

Similarly, the concave portion 76 include includes an inner radius 77 and an outer radius 78. Tangents of the inner radius 77 and the outer radius 78 seal against a convex portion 215 of the second seal surface 214. Notably, when sealed, the generally flat inner surface 72 and the generally flat outer surface 74 do not contact or touch the flat surface 232 of the inner diameter 230 and/or the flat surface 242 of the outer diameter 240 of the gasket 200.

In certain aspects, only the inner radius 47 and the outer radius 48 of the concave portion 46 seal against the first seal surface 212 and only the inner radius 77 and the outer radius 78 of the concave portion 76 seal against the second seal surface 214. Other flat surfaces of the gasket 200 and the end surface 40 and 70 do not seal together.

The gasket 200 may be formed from a non-compressible metal or metal alloy, such as 304 stainless steel or other food-safe stainless steel alloys. The gasket 200 may wholly or nearly completely made from 304 stainless steel or other stainless steel alloys. The gasket 200 does not generally flex, compress, or bend at the sealing regions or contact points between the concave portion 46 and the first seal surface 212 or the concave portion 76 and the second seal surface 214. The contact between the tangents of the inner radius 47 and the outer radius 48 against the convex portion 213 of the first seal surface 212 provides the seal between the end surface 40 of the ferrule 34 and the gasket 200, and the contact between the tangents of the inner radius 77 and the outer radius 78 against the convex portion 215 of the second seal surface 214 provides the seal between the end surface 70 of ferrule 64 and the gasket 200.

Thus, a gasket and clamp system 10 is provided that prevent or reduces accidental loss of the gasket 200. Further, in the event of accidental loss, the gasket 200 (or its pieces) are easier to locate using magnetic scanning.

As such, it should be understood that the disclosure is not limited to the particular aspects described herein, but that various changes and modifications may be made without departing from the spirit and scope of this novel concept as defined by the following claims. Further, many other advantages of applicant's disclosure will be apparent to those skilled in the art from the above descriptions and the claims below.

The invention claimed is:

1. A clamp and gasket system, comprising:
a clamp, the clamp comprising a first arm and a second arm, the first arm and the second arm are pivotally connected together, and the first arm including a slot;
a gasket, the gasket comprising an inner diameter and an outer diameter, the gasket comprising a tab portion, wherein the tab portion is integral with the outer diameter, wherein the tab portion extends outward from the outer diameter, wherein the tab portion including an opening, the gasket comprising a seal surface positioned between the inner diameter and the outer diameter of the gasket, the seal surface includes a first seal surface having a first convex portion and a second seal surface having a second convex portion on opposite sides of the gasket;
the tab portion configured to pass through the slot of the first arm; and,
a holding member configured to engage with the opening of the tab portion.

2. The clamp and gasket system according to claim 1, wherein the holding member engages with the opening of the tab portion, and the holding member secures the gasket to the first arm of the clamp.

3. The clamp and gasket system according to claim 1, wherein the gasket and the tab portion are wholly or nearly completely made from stainless steel or a stainless steel alloy.

4. The clamp and gasket system according to claim 1, wherein the first seal surface having a first flat surface and a second flat surface on opposite sides of the first convex portion, and the second seal surface having a first flat surface and a second flat surface on opposite sides of the second convex portion.

5. The clamp and gasket system according to claim 1, wherein the holding member is too large to pass through the slot.

6. The clamp and gasket system according to claim 1, wherein a combination of the holding member and the tab portion is too large to pass through the slot.

7. The clamp and gasket system according to claim 1, wherein the slot in the first arm is larger than the tab portion.

8. The clamp and gasket system according to claim 1, wherein the slot passes from an inner surface of the first arm to an outer surface of the first arm.

9. The clamp and gasket system according to claim 1, wherein the slot completely passes through a width of the first arm.

10. The clamp and gasket system according to claim 1, wherein the slot is generally parallel to a length of the first arm.

11. The clamp and gasket system according to claim 1, wherein the clamp and gasket system is configured to form a unitary member.

12. The clamp and gasket system according to claim 1, wherein the holding member is a bolt and nut combination, a d-ring, a carabiner, a lock, or other mechanical structure that includes a portion that passes through the opening in the tab portion.

13. The clamp and gasket system according to claim 1, wherein the tab portion includes a tag area with markings, writing, or other indicia.

14. The clamp and gasket system according to claim 1, wherein the clamp is configured to move between an open position and a closed position, wherein in the open position, the holding member holds the gasket to the first arm.

15. The clamp and gasket system according to claim 1, wherein the clamp is configured to move between an open position and a closed position, wherein in the open position, the holding member holds the gasket to the first arm, and, wherein in the open position, the holding member is configured to engage and disengage from the opening.

16. The clamp and gasket system according to claim 1, wherein the clamp is configured to move between an open position and a closed position, wherein in the open position, the holding member holds the gasket to the first arm until the holding member is disengaged from the opening.

17. The clamp and gasket system according to claim 1, wherein a length of the slot is aligned with a length of the first arm, and the length of the slot is greater than both a depth and a width of the slot.

18. A clamp and gasket system, comprising:
a clamp, the clamp comprising a first arm and a second arm, the first arm and the second arm are pivotally connected together, and the first arm including a slot or opening;
the clamp configured to move between an open position and a closed position;
a gasket, the gasket comprising an inner diameter and an outer diameter, the gasket comprising a tab portion, wherein the tab portion is integral with the outer diameter, wherein the tab portion extends outward from the outer diameter, the tab portion including an opening, the gasket comprising a first seal surface and a second seal surface positioned between the inner diameter and the outer diameter of the gasket, the first seal surface having a first convex portion and the second seal surface having a second convex portion on opposite sides of the gasket;
the tab portion configured to pass through the slot or opening of the first arm; and, a holding member configured to engage with the opening of the tab portion, wherein the holding member holds the gasket to the first arm.

19. The clamp and gasket system according to claim 18, wherein, in the open position, the holding member holds the gasket to the first arm.

20. A method of clamping together sanitary tubes, comprising:

providing an end of a first sanitary tube and an end of a second sanitary tube;

providing a clamp and gasket system, comprising: a clamp, the clamp comprising a first arm and a second arm, the first arm and the second arm are pivotally connected together, and the first arm including a slot; a gasket, the gasket comprising a tab portion, the tab portion including an opening; the tab portion configured to pass through the slot of the first arm; and a holding member configured to engage with the opening, the gasket comprising a first seal surface and a second seal surface positioned between an inner diameter and an outer diameter of the gasket, the first seal surface having a first convex portion and the second seal surface having a second convex portion on opposite sides of the gasket;

positioning the gasket between the ends of the first sanitary tube and the second sanitary tube;

inserting the tab portion through the slot;

closing the clamp;

engaging the holding member to the opening of the tab portion; and securing the gasket to the first arm.

21. A clamp and gasket system to seal ends of sanitary tubing, comprising:

a gasket, the gasket comprising a seal surface positioned between an inner diameter and an outer diameter of the gasket, the seal surface includes a first seal surface having a first convex portion and a second seal surface having a second convex portion on opposite sides of the gasket;

the first seal surface having a first flat surface and a second flat surface on opposite sides of the first convex portion;

the second seal surface having a first flat surface and a second flat surface on opposite sides of the second convex portion;

a clamp, the clamp comprising a first arm and a second arm, the first arm and the second arm are pivotally connected together;

an end of a first sanitary tube includes a first concave portion;

an end of a second sanitary tube includes a second concave portion; and, the clamp configured to hold the end of the first sanitary tube together with the end of the second sanitary tube in a sealing engagement with the gasket, wherein the first concave portion seals against the first convex portion and the second concave portion seals against the second convex portion;

the gasket comprising a tab portion, wherein the tab portion is integral with the outer diameter, wherein the tab portion extends outward from the outer diameter, wherein the tab portion including an opening;

the tab portion configured to pass through a slot of the first arm; and a holding member configured to engage with the opening of the tab portion.

22. The clamp and gasket system to seal ends of sanitary tubing according to claim 21, wherein the first concave portion includes a first inner radius and a first outer radius, and tangents of the first inner radius and the first outer radius seal against the first convex portion, and the second concave portion include includes a second inner radius and a second outer radius, and tangents of the second inner radius and the second outer radius seal against the second convex portion.

23. The clamp and gasket system to seal ends of sanitary tubing according to claim 21, wherein the gasket is wholly or nearly completely made from 304 stainless steel or other stainless steel alloys, and wherein the gasket is non-compressible.

24. The clamp and gasket system to seal ends of sanitary tubing according to claim 21, wherein the end of the first sanitary tube is generally perpendicular to a length of the first sanitary tube, wherein the end of the first sanitary tube includes the first concave portion between a generally flat inner surface and a generally flat outer surface, wherein the end of the second sanitary tube is generally perpendicular to a length of the second sanitary tube, wherein the end of the second sanitary tube includes the second concave portion between a generally flat inner surface and a generally flat outer surface, wherein in the sealing engagement, the generally flat inner surfaces and the generally flat outer surfaces do not touch the first and second flat surfaces of the first sealing surface or the first and second flat surfaces of the second sealing surface.

* * * * *